United States Patent
Terai (12) 
(10) Patent No.: US 6,453,505 B1
(45) Date of Patent: Sep. 24, 2002

(54) WINDSHIELD WIPER FOR AUTOMOBILE

(75) Inventor: Tadayoshi Terai, Hamamatsu (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 09/069,229

(22) Filed: Apr. 27, 1998

(30) Foreign Application Priority Data

Apr. 28, 1997 (JP) .............................. 9-111524

(51) Int. Cl.[7] .................. B60S 1/32; B60S 1/28
(52) U.S. Cl. .................... 15/250.201; 15/250.27; 15/250.351
(58) Field of Search .............. 15/250.201, 250.27, 15/250.351, 250.16, 250.3

(56) References Cited

U.S. PATENT DOCUMENTS

| | | | | |
|---|---|---|---|---|
| 3,942,212 A | * | 3/1976 | Steger et al. ............. | 15/250.32 |
| 4,431,954 A | * | 2/1984 | Carpenter et al. ........ | 15/250.16 |
| 4,782,547 A | * | 11/1988 | Mohnach ................ | 15/250.351 |
| 4,969,227 A | * | 11/1990 | Reed et al. .............. | 15/250.14 |
| 4,989,290 A | * | 2/1991 | Hoshino ................ | 15/250.201 |
| 5,157,314 A | * | 10/1992 | Kuehbauch .............. | 15/250.34 |
| 5,651,159 A | * | 7/1997 | Hoshino ................ | 15/250.201 |

FOREIGN PATENT DOCUMENTS

| | | | |
|---|---|---|---|
| DE | 3343318 | * | 6/1985 |
| DE | 3424729 | * | 2/1986 |
| EP | 210420 | * | 6/1986 |
| GB | 1105704 | * | 3/1968 |
| JP | 57-159557 U | | 10/1982 |
| JP | 58-135353 U | | 9/1983 |
| JP | 5-92013 U | | 12/1993 |

* cited by examiner

Primary Examiner—Robert J. Warden, Sr.
Assistant Examiner—Kaj K. Olsen
(74) Attorney, Agent, or Firm—Fish & Richardson P.C.

(57) ABSTRACT

A first wiper having an arm and blade and a second wiper having an arm and blade are located at a lower end of a windshield. The first and second wipers are positioned in parallel to each other with a certain overlapped region, the second wiper being in front of the first wiper, when they are not operated. Wind stream hits the wipers from the front when a vehicle is running. A surface for guiding the wind stream. upward (opposite to the windshield surface) is formed on the arm of the second wiper so that the guided wind stream does not hit the first wiper positioned behind the second wiper. Thus, noises caused by the wind stream flowing through the first wiper after the wind stream first hits the second wiper are effectively reduced.

17 Claims, 6 Drawing Sheets

WINDSHIELD WIPER FOR AUTOMOBILE

CROSS-REFERENCE TO RELATED APPLICATION

This application is based upon and claims benefit of priority of Japanese Patent Application No. Hei-9-111524 filed on Apr. 28, 1997, the content of which is incorporated herein by reference.

BACKGROUND OF THE INVENTION

1. Field of the Invention

The present invention relates to a windshield wiper for cleaning the surface of a windshield of an automotive vehicle.

2. Description of Related Art

There is a tendency that the surface area of a windshield of an automobile becomes larger, and accordingly a longer wiper blade is required. In addition, the curvature of the windshield tends to be larger, and more streamline shape is being employed in an automobile body to improve its aerodynamic characteristics. When a longer wiper blade is used, a higher amount of air flow hits the wiper. Also, most of air flows along the surface of a vehicle body and the windshield when the body is designed with a streamline. As the amount of air or the speed of air hitting the wiper increases, noises caused by the air flow hitting the wiper becomes a problem. The air hitting the wiper and flowing through spaces between levers or between levers and a rubber blade of the wiper causes the noise problem.

Because the wiper usually rests at a position parallel to a lateral direction of a vehicle body (the longitudinal direction of the wiper lies in parallel to the width direction of a vehicle body), more wind flow hits the wiper when the vehicle is driven. To decrease the amount of air hitting the wiper, the wiper is stored in the vehicle body in some automobiles (a concealed wiper) when the wiper is not in use. However, because a special space has to be made in the vehicle body to conceal the wiper, it is not always possible to employ this design. It is especially difficult for small vehicles.

SUMMARY OF THE INVENTION

The present invention has been made in view of the above-mentioned problem, and an object of the present invention is to provide a windshield wiper designed to reduce noises caused by air hitting the wiper, and more particularly to provide such an wiper which has a simple structure and can be manufactured at a low cost.

A pair of wipers, each having a wiper arm and blade, rest at the lower end of a windshield of an automobile when they are not in use. They are located in parallel to each other and in parallel to the width direction of the automobile body with a certain overlapped region. They keep that position when the automobile is running, and wind stream directly hits the windshield wipers. When the wind stream flows through the blade, uncomfortable noises are generated.

To reduce such noises, a wind stream guiding surface is formed on a wiper arm which rests in front of or upstream of the other wiper according to the present invention. The wind stream first hits the wiper arm having the wind stream guiding surface, and the wind stream is guided upward or the direction thereof is changed by the guiding surface so that wind does not hit the other wiper located behind the one wiper. The wiper arm includes a wiper head connected to a pivotal shaft and a retainer connected to the wiper head biasing the wiper toward the surface of the windshield. The surface for guiding the wind stream upward is formed on both the retainer and the arm head, or on either one of them. The wind stream guiding surface may be formed by covering the arm head and retainer with a cover having such a surface. The shape of the guiding surface may be variably designed according to wind stream patterns peculiar to any given automobile bodies.

In addition to reduce or avoid the wind stream hitting the other wiper located downstream after it first hits the one wiper located upstream, it may be also needed to reduce or avoid the wind stream hitting the own wiper blade after it first hits the wiper arm to which that wiper blade is connected. To reduce the wind stream hitting its own wiper blade, the guiding surface may be formed also on the wiper arm which is located downstream.

The guiding surface may be either a flat surface or a concave surface ascending from its upstream toward its downstream, as long as an extended line of the guiding surface goes above the wiper located downstream.

By providing the wind stream guiding surface, which has a simple and inexpensive structure, according to the present invention, noises caused by wind stream flowing through the wiper can be effectively reduced.

Other objects and features of the present invention will become more readily apparent from a better understanding of the preferred embodiments described below with reference to the following drawings.

DETAILED DESCRIPTION OF THE PREFERRED EMBODIMENTS

Figure 1:
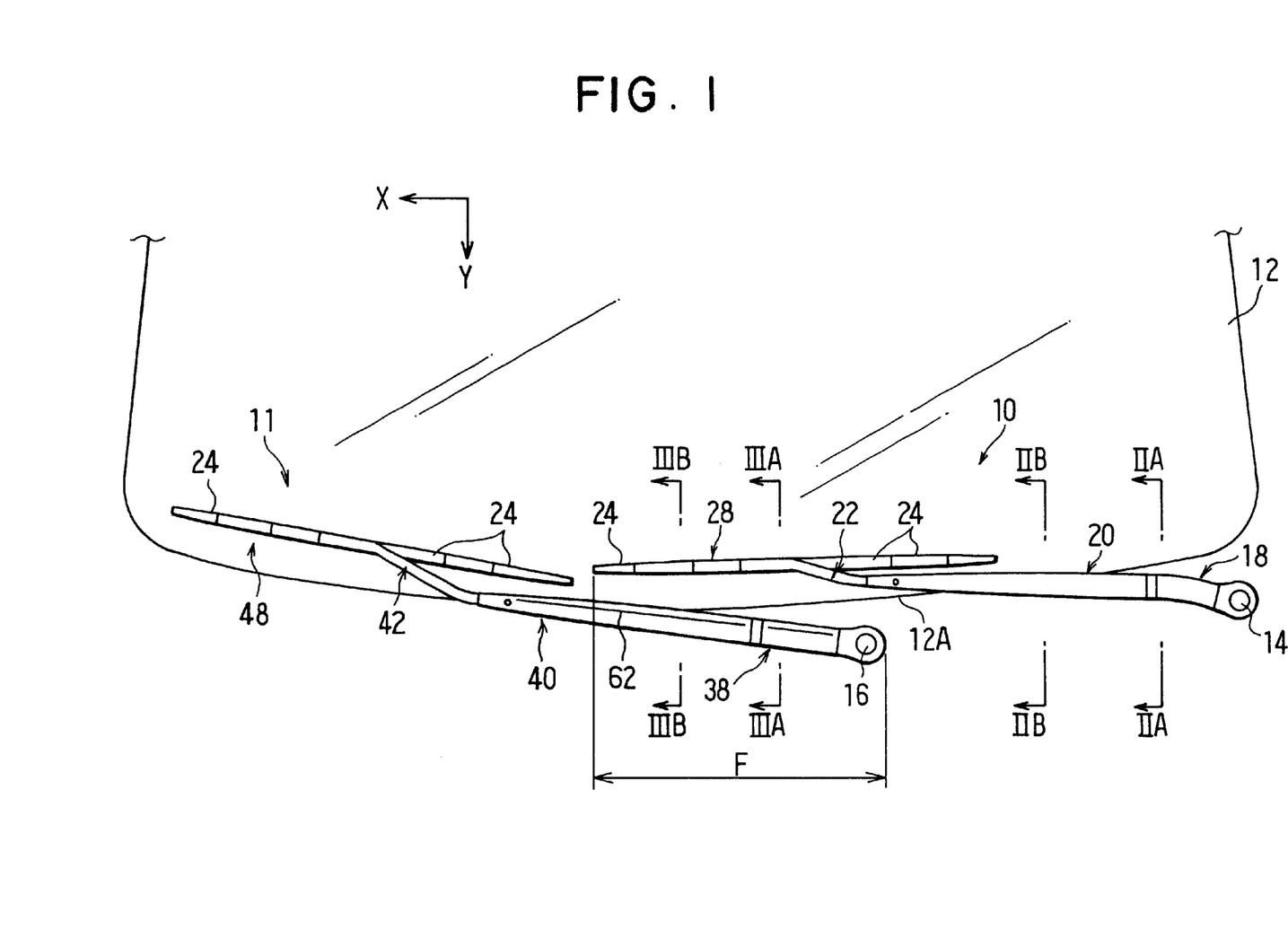
FIG. 1 is a plan view showing a pair of windshield wipers, as a first embodiment according to the present invention, at their resting position on a windshield.

Referring to FIGS. 1, 2A, 2B, 3A and 3B, a first embodiment according to the present invention will be described. FIG. 1 is a plan view showing a pair of wipers, first wiper 10 and second wiper 11 at their resting position on a windshield 12. Pivot shaft 14 for driving first wiper 10 and another pivot shaft 16 for driving second wiper 11 are located under lower edge 12A of windshield 12. First wiper 10 and second wiper 11 is installed on an vehicle body, forming overlapped region "F" as shown in FIG. 1. Both wipers 10 and 11 have a similar structure, but second wiper 11 is designed a little different from first wiper 10 to decrease wind stream hitting first wiper 10 after it first hits second wiper 11, which will be described later. A direction "X" shown in FIG. 1 and other figures is a direction on windshield 12 parallel to the width of a vehicle body, and a direction "Y" is a direction on windshield 12 perpendicular to direction "X".

The structure of first wiper 10 will be described, referring to FIGS. 1, 2A and 2B. Arm head 18 is connected to pivot shaft 14 and pivotally rotated by pivot shaft 14. Retainer 20 is connected to arm head 18, and arm piece 22 is connected to the tip of retainer 20. Arm head 18, retainer 20 and arm piece 22 constitute an wiper arm for the first wiper. The wiper arm is biased toward windshield 12 by a spring, one end being fixed to the retainer and the other end to arm head 18. However, the spring is invisible in FIG. 1 because it is contained in the retainer 20 at its windshield side. Wiper blade 28 composed of blade rubber 26 (shown in FIGS. 3A, etc) and plural levers 24 supporting blade rubber 26 is connected to the tip of arm piece 22. Blade rubber wipes and cleans the surface of windshield 12 as it is rotated by the wiper arm.

Figure 2A:
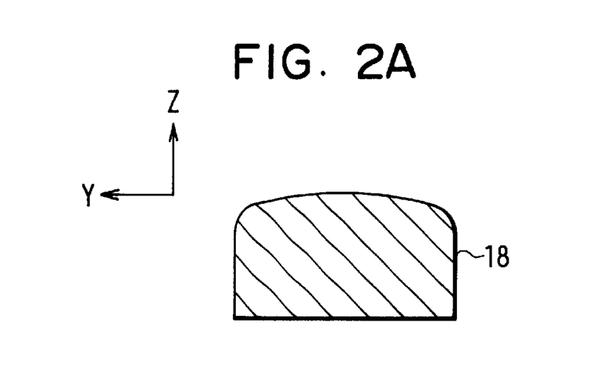
FIG. 2A is a cross-sectional view, taken along a line IIA—IIA in FIG. 1, showing an arm head of a first wiper (a right side wiper) shown in FIG. 1.
Figure 2B:
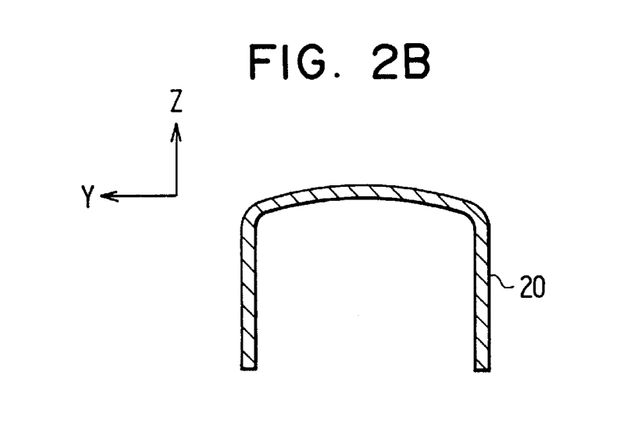
FIG. 2B is a cross-sectional view, taken along a line IIB—IIB in FIG. 1, showing a retainer of the first wiper shown in FIG. 1.

The cross-sectional shape of arm head 18 is shown in FIG. 2A. It has a convex curved surface on the upper side and a flat surface on the lower side, the side facing windshield 12. In the same manner, the cross-sectional shape of retainer 20 is shown in FIG. 2B. It is cup-shaped with a curved surface on its top and an opening at its bottom.

Second wiper 11 has a similar structure to first wiper 10. The wiper arm for second wiper 11 is composed of arm head 38, retainer 40 and arm piece 42, all connected to each other in the same manner as the wiper arm for first wiper 10. Wiper blade 48 having the same structure as wiper blade 28 is connected to the tip of arm piece 42. Second wiper 11 as a whole is pivotally rotated by pivot shaft 16 and cleans the surface of windshield 12.

Figure 3A:
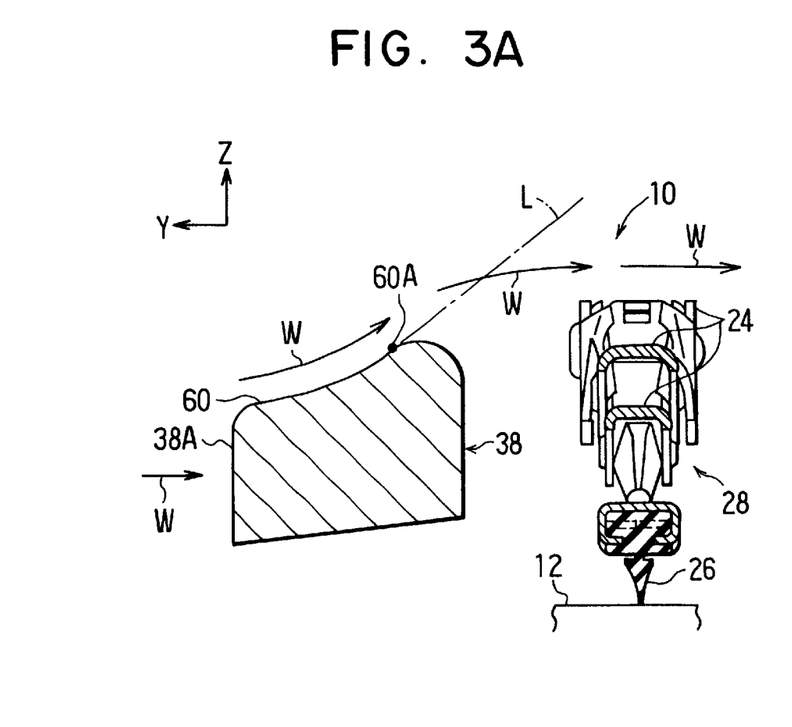
FIG. 3A is a cross-sectional view, taken along a line IIIA—IIIA in FIG. 1, showing a wind flow through the wiper.

The cross-sectional shape of arm head 38 and wind stream or air flow "W" are shown in FIG. 3A. A direction "Z" shown in the drawing is a direction perpendicular to the surface of windshield 12. As seen in the drawing, the top surface of arm head 38 is concave curved surface 60, its bottom surface is flat, and its front surface 38A is also flat. Curved surface 60 gradually ascends from its front to rear, ending at ridge 60A. Line "L" denotes an extension of curved surface 60. Wind stream "W" flows along curved surface 60 toward first wiper 10 which is located downstream of second wiper 11. Wind stream directly hitting first wiper 10 is alleviated by curved surface 60. In other words, curved surface 60 functions as a surface for guiding wind stream upward.

Figure 3B:
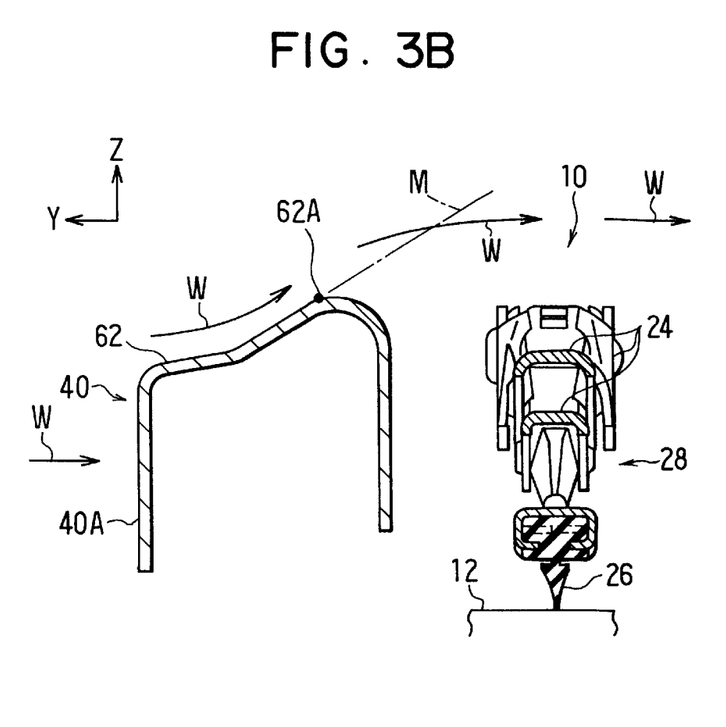
FIG. 3B is a cross-sectional view, taken along a line IIIB—IIIB in FIG. 1, showing a wind flow through the wiper.

The cross-sectional shape of retainer 40 of second wiper 11 is shown in FIG. 3B. Retainer 40 has concave curved surface 62 which is similar to curved surface 60 of arm head 38. The bottom end of retainer 40 is open, and the front side is flat surface 40A. Curved surface 62 gradually ascends from its front to rear, ending at ridge 62A. Line M denotes an extension of curved surface 62. Wind stream "W" is guided upward by curved surface 62, thereby decreasing an amount of air directly hitting first wiper 10 which is positioned downstream of second wiper 11. Curved surface 62 of retainer 40 serves as a wind stream guiding surface in the same manner as curved surface 60 of arm head 38.

A pair of wipers 10 and 11 are made as described above, and first wiper 10 is positioned behind second wiper 11, forming overlapped region "F". Wind stream "W" which first hits. second wiper 11 is guided upward by curved surface 60 of arm head 38 and curved surface 62 of retainer 40, and thereby only much less wind stream flows through first wiper 10, especially through wiper blade 28 of first wiper 10. Therefore, noises caused by wind stream flowing through first wiper 10, especially through wiper blade 28, are reduced. Curved surfaces 60 and 62 have to be designed, taking a wind stream pattern of a particular vehicle body on which the wiper is installed into account, to effectively guide the wind stream to flow above first wiper 10.

Figure 4A:
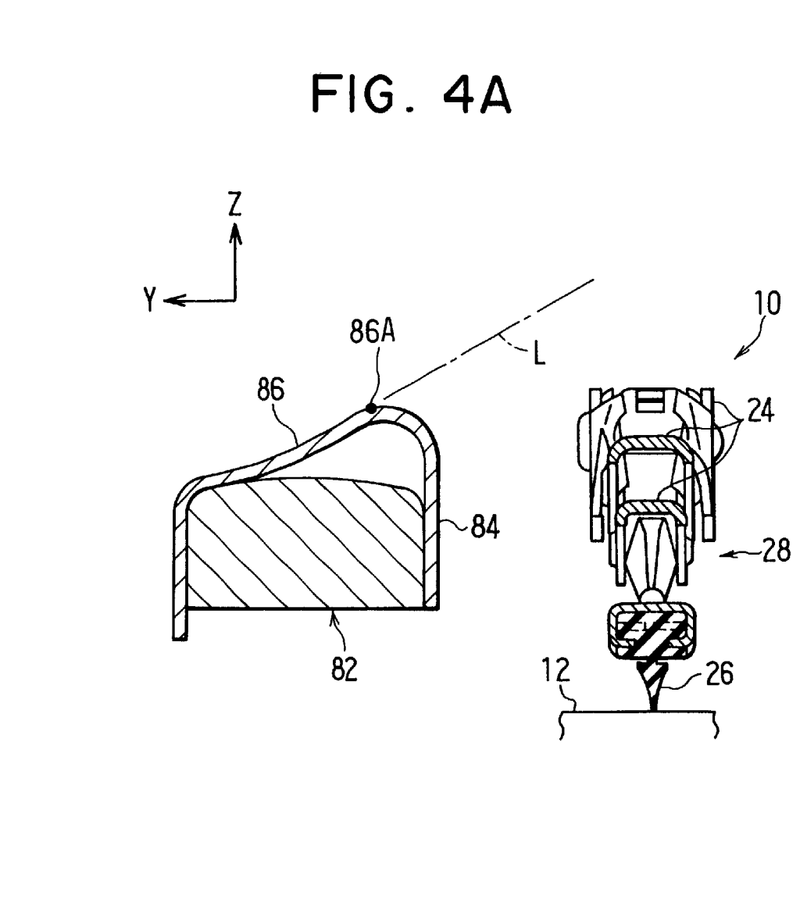
FIG. 4A is a cross-sectional view showing an arm head of a second embodiment according to the present invention.
Figure 4B:
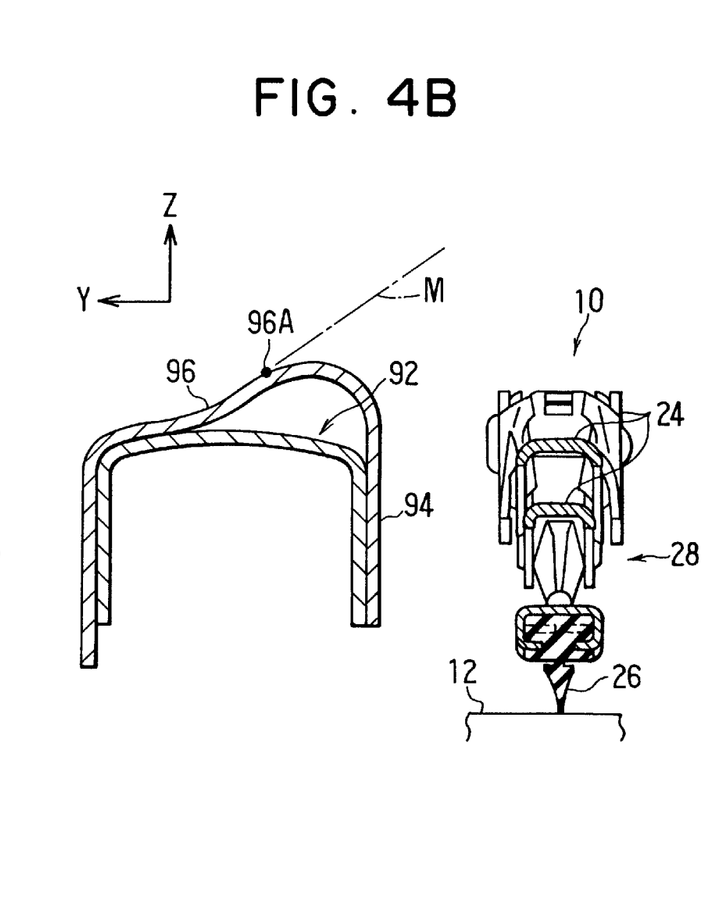
FIG. 4B is a cross-sectional view showing a retainer of the second embodiment.

Referring to FIGS. 4A and 4B, a second embodiment according to the present invention will be described. In this embodiment, only the structure of the arm head and retainer of the second wiper is different from that of the first embodiment, while other structures including first wiper 10 are the same as those of the first embodiment. As shown in FIG. 4A, arm head 82 which has the same cross-sectional shape as arm head shown in FIG. 2A is used, and arm head cover 84 is disposed on arm head 82. Arm head cover 84 has curved surface 86 for guiding wind stream upward. Curved surface 86 gradually ascends from its front toward rear up to ridge 86A. Line L denotes an extension of curved surface 86. Arm head cover 84 may be fixed to arm head 82 by fastening means such as rivets or screws, or snapped-in to arm head 82 so that it can be removed. As shown in FIG. 4B, retainer 92 which has the same cross-sectional shape as retainer 20 shown in FIG. 2B is used in this embodiment. Retainer cover 94 having curved surface 96 is fixed to retainer 92 or snapped-in thereto. Curved surface 96 gradually ascends form the front toward the rear up to ridge 96A so that it guides wind stream upward. Line M denotes an extension of curved surface 96.

The second embodiment described above performs the same function as the first embodiment as to guiding wind stream upward to reduce wind stream going through first wiper 10. Because arm head cover 84 and retainer cover 94 are made separate from arm head 82 and retainer 92, respectively, it is easier to change the form of the curved surfaces according to a wind stream pattern of a particular vehicle body on which the wiper is installed, so that the curved surfaces can guide wind stream more effectively.

Figure 5A:
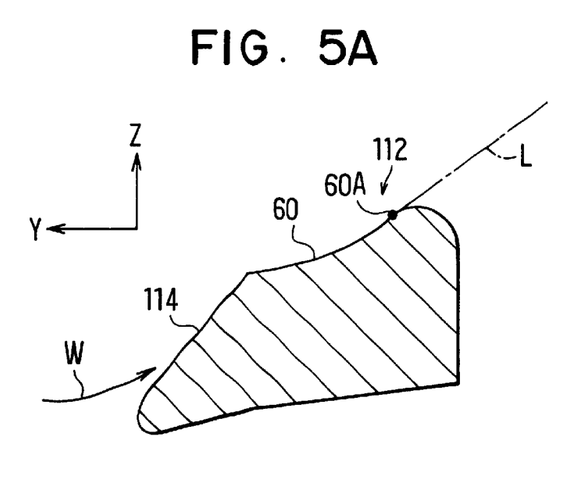
FIG. 5A is a cross-sectional view showing an arm head of a third embodiment according to the present invention.
Figure 5B:
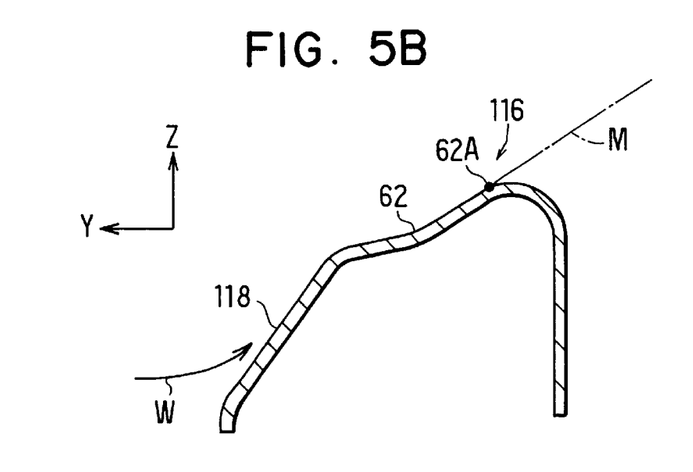
FIG. 5B is a cross-sectional view showing a retainer of the third embodiment.

Referring to FIGS. 5A and 5B, a third embodiment will be described. In this embodiment, only the cross-sectional shape of the arm head and the retainer of second wiper 11 is different from that of the first embodiment. Other structures are the same as those of the first embodiment. FIG. 5A shows the cross-sectional shape of arm head 112 having slanted front surface 114 and curved surface 60. Curved surface 60 gradually ascends from the back end of slanted front surface 114 up to its ridge 60A. Line L denotes an extension of curved surface 60. Wind stream "W" first hits a nose of slanted front surface 114 and then flows along slanted front surface 114 and curved surface 60. FIG. 5B shows the cross-sectional shape of retainer 116 having slanted front surface 118 and curved surface 62 ascending gradually up to its ridge 62A. Line M denotes an extension of curved surface 62. Wind stream "W" is guided upward by slanted front surface 118 and curved surface 62. As the same manner as in the first embodiment, wind stream flowing through first wiper 10 is reduced and thereby noises caused by the wind stream are reduced.

Figure 6:
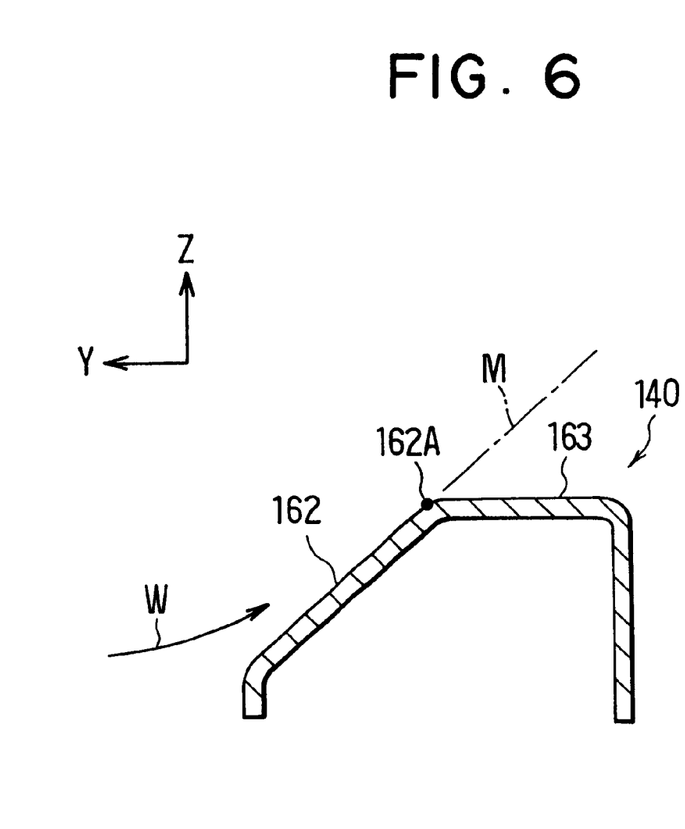
FIG. 6 is a cross-sectional view showing a modified form of the retainer according to the present invention.

FIG. 6 shows a modified form of the retainer of the second wiper which may be used in the foregoing embodiments.

Retainer 140 has slanted front surface 162 and flat top surface 163. Slanted front surface 162 ascends from its front nose up is; to ridge 162A where flat top surface 163 is connected thereto. Line "M" denotes an extension of slanted front surface 162. Wind stream "W" is guided upward by slanted front surface 162 to reduce wind stream going through first wiper 10 in the same manner as in the first embodiment.

Figure 7:
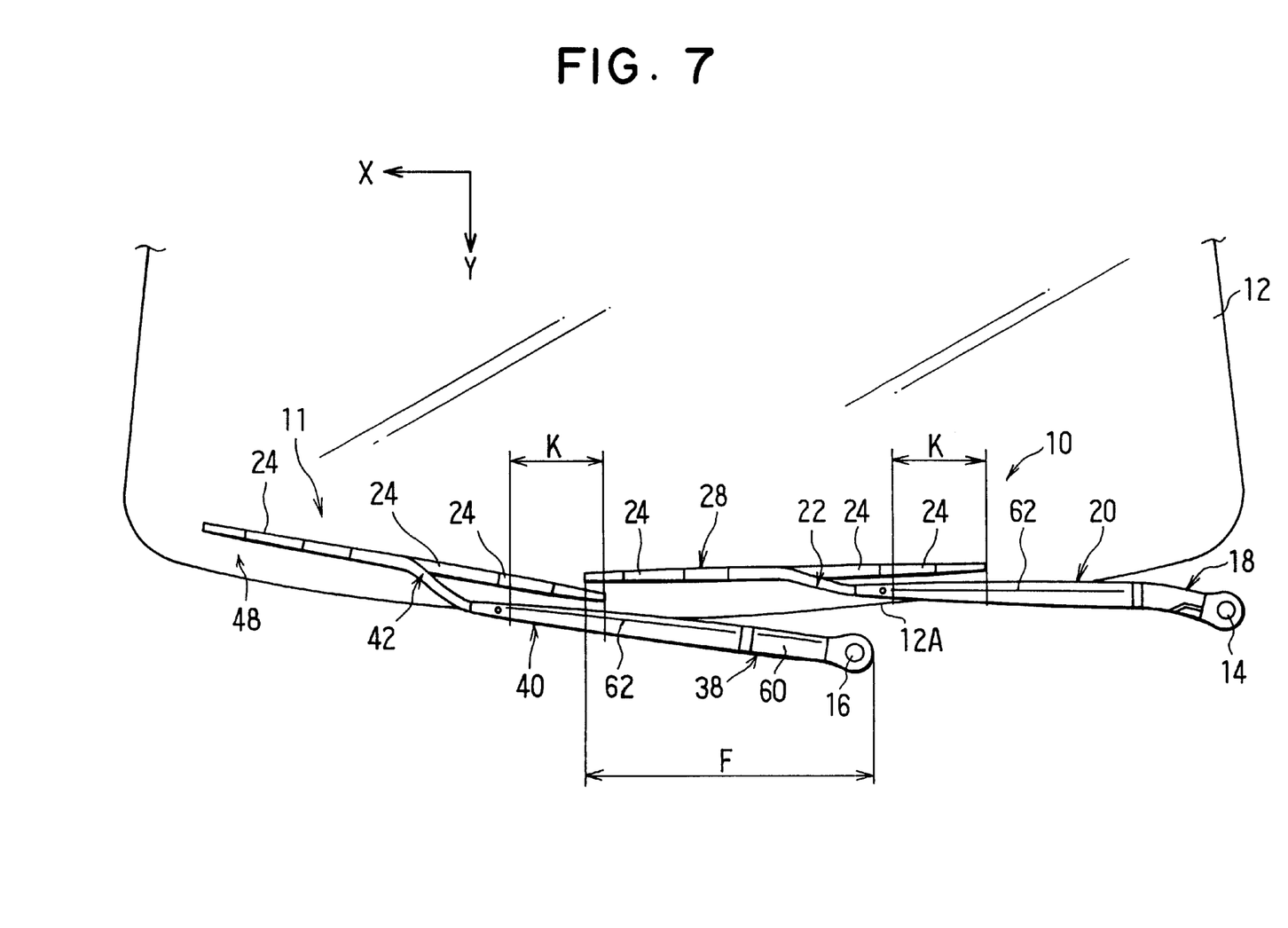
FIG. 7 is a plan view showing a pair of wipers, as a modification of the first embodiment, at their resting position on the windshield.

FIG. 7 shows a modification of the first embodiment. Both wiper blades 28 and 48 are overlapped a little more than in the first embodiment. Retainer 20 of the first wiper 10 has the same cross-sectional shape as that of retainer 40 of the first embodiment. That is, curved surface 62 shown in FIG. 3B is also formed on retainer 20. As shown in FIG. 7, in addition to overlapped region "F" in which both wipers 10 and 11 overlap with each other, there are regions "K" in which the wiper arm overlaps with its own blade. In order to reduce wind stream going through wiper blade 28 in region "K" after it first hits retainer 20 of the first wiper, curved surface 62 for guiding the wind stream upward is formed on retainer 20. As to the retainer 40 of second wiper 11, curved surface 62 is formed in the same manner as in the first embodiment. In other words, only the curved surface on retainer 20 of the first wiper is added in this modification, compared with the first embodiment. Thus, noises caused by wind stream flowing through both regions "F" and "K" can be reduced.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A windshield wiper for an automobile comprising:
   a first wiper including a first wiper arm and a first wiper blade connected to the first wiper arm, and the first wiper arm being connected to a first pivotal shaft disposed below a windshield of an automobile body, the first wiper being pivotally rotated by the first pivotal shaft so that the first wiper blade cleans a surface of the windshield; and
   a second wiper including a second wiper arm and a second wiper blade connected to the second wiper arm, the second wiper arm being connected to a second pivotal shaft disposed below the windshield of the automobile body, the second wiper being pivotally rotated by the second pivotal shaft so that the second wiper blade cleans the surface of the windshield,
   each of said first and second wiper blades including a blade rubber portion and a plurality of holding levers supporting said blade rubber portion, which leaves first spaces between said holding levers;
   both the first and second wipers moving simultaneously in the same direction to wipe the windshield and taking their resting position, when they are not operated, at a lowest part of the windshield with their longitudinal direction placed substantially in parallel to a width direction of the automobile body and substantially in parallel with each other, the second wiper being located in adjacent front of the first wiper with a first overlapped region in which the second wiper arm overlaps with at least more than half part of the first wiper blade so that a wind stream first hits the second wiper arm and then the first wiper blade in the overlapped region when the automobile is running; wherein:
   the second wiper arm includes a surface, coupled to said holding lever, for guiding the wind stream upward to reduce the wind stream hitting the first wiper blade and to reduce the wind stream flow through said first spaces between the holding levers and also reduce wind stream through spaces between the blade rubber position and said holding levers.

2. The windshield wiper as in claim 1, wherein:
   the first wiper arm includes a first arm head connected to the first pivotal shaft and a first retainer connected to the first arm head, the first retainer biasing the first wiper toward the surface of the windshield; and
   the second wiper arm includes a second arm head connected to the second pivotal shaft and a second retainer connected to the second arm head, the second retainer biasing the second wiper toward the surface of the windshield.

3. The windshield wiper as in claim 2, wherein:
   the wind stream guiding surface is formed on the second arm head and/or the second retainer.

4. The windshield wiper as in claim 2, wherein:
   the second arm head and/or the second retainer is covered by a cap having the wind stream guiding surface formed thereon.

5. The windshield wiper as in claim 3 or 4, wherein:
   the wind stream guiding surface is a flat surface ascending from an upstream toward a downstream of the wind stream, and an extended line of the wind stream guiding surface is directed above the first wiper so that the guided wind stream does not hit the first wiper and the wind stream guiding surface reducing the wind stream flowing through spaces between the plurality of blade levers of the first wiper blade.

6. The windshield wiper as in claim 3 or 4, wherein:
   the wind stream guiding surface is a concave surface ascending from an upstream toward a downstream of the wind stream, and an extended line of the windstream guiding surface is directed above the first wiper so that the guided wind stream does not hit the first wiper and the wind stream guiding surface reducing the wind stream flowing through spaces between the plurality of blade levers of the first wiper blade.

7. The windshield wiper as in claim 1, wherein:
   both the first and second wipers are located, when they are at their resting position, so that a second overlapped region in addition to the first overlapped region is formed, in which the first wiper arm overlaps with a part of the first wiper blade and the second wiper arm overlaps with a part of the second wiper blade so that the wind stream first hits each wiper arm and then the respective wiper blade in the second overlapped region when the automobile is running; and
   both wiper arms include a surface for guiding the wind stream upward to reduce the wind stream hitting the respective wiper blades.

8. The windshield wiper as in claim 7, wherein:
   the first wiper arm includes a first arm head connected to the first pivotal shaft and a first retainer connected to the first arm head, the first retainer biasing the first wiper toward the surface of the windshield.

9. The windshield wiper as in claim 8, wherein:
   the wind stream guiding surface of the first wiper arm is formed on the first retainer.

10. The windshield wiper as in claim 8, wherein:
    the wind stream guiding surface of the first wiper arm is formed by covering the first retainer with a cover having the wind stream guiding surface.

11. The windshield wiper as in claim 9 or 10, wherein:
the wind stream guiding surface is a flat surface ascending from an upstream toward a downstream of the wind stream, and an extended line of the wind stream guiding surface is directed above the first wiper blade so that the guided wind stream does not hit the first wiper blade.

12. The windshield wiper as in claim 9 or 10, wherein:
the wind stream guiding surface is a concave surface ascending from an upstream toward a down stream of the wind stream, and an extended line of the wind stream guiding surface is directed above the first wiper blade so that the guided wind stream does not hit the first wiper blade.

13. The windshield wiper as in claim 7, wherein:
both the first and second wiper arms are positioned in front of a front side surface of the respective first and second wiper blades when the windshield wiper is at the resting position, and a tip of each wiper arm is bent toward each wiper blade.

14. The windshield wiper as in claim 13, wherein:
the second overlapped regions are formed for both the first and second wipers, respectively, and the wind stream guiding surface of the first wiper arm reduces an amount of wind flowing through the spaces between plural levers of the first wiper blade and similarly the windstream guiding surface of the second wiper arm reduces an amount of wind flowing through the spaces between plural levers of the second wiper blade.

15. The windshield wiper of claim 1, wherein the surface of the second wiper arm comprises a slanted front surface for guiding the wind stream upward, wherein the slanted front surface ascends straight from its front nose up to a ridge where a flat top surface is connected thereto.

16. A windshield wiper for an automobile comprising:
a first wiper including a first wiper arm and a first wiper blade connected to the first wiper arm, and the first wiper arm being connected to a first pivotal shaft disposed below a windshield of an automobile body, the first wiper being pivotally rotated by the first pivotal shaft so that the first wiper blade cleans a surface of the windshield; and a second wiper including a second wiper arm and a second wiper blade connected to the second wiper arm, the second wiper arm being connected to a second pivotal shaft disposed below the windshield of the automobile body, the second wiper being pivotally rotated by the second pivotal shaft so that the second wiper blade cleans the surface of the windshield, each of said first and second wiper blades including a blade rubber portion and a plurality of holding levers supporting said blade rubber portion, which leaves first spaces between said holding levers;

both the first and second wipers moving simultaneously in the same direction to wipe the windshield and taking their resting position, when they are not operated, at a lowest part of the windshield with their longitudinal direction placed substantially in parallel to a width direction of the automobile body and substantially in parallel with each other, the second wiper being located in adjacent front of the first wiper with a first overlapped region in which the second wiper arm overlaps with at least part of the first wiper blade extending from a longitudinal leading end to a portion connected to the first wiper arm so that a wind stream first hits the second wiper arm and then the first wiper blade in the overlapped region when the automobile is running; wherein:

the second wiper arm includes a surface, coupled to said holding lever, for guiding the wind stream upward to reduce the wind stream hitting the first wiper blade and to reduce the wind stream flow through said first spaces between the holding levers and also reduce wind stream through spaces between the blade rubber position and said holding levers.

17. The windshield wiper of claim 16 wherein the surface of the second wiper arm comprises a slanted front surface for guiding the wind stream upward, wherein the slanted front surface ascends straight from its front nose up to a ridge where a flat top surface is connected thereto.

* * * * *

UNITED STATES PATENT AND TRADEMARK OFFICE
CERTIFICATE OF CORRECTION

PATENT NO.    : 6,453,505 B1
DATED         : September 24, 2002
INVENTOR(S)   : Tadayoshi Terai It is certified that error appears in the above-identified patent and that said Letters Patent is hereby corrected as shown below:

<u>Title page,</u>
Item [73], Assignee, please insert -- Toyota Jidosha Kabushiki Kaisha, Toyota-Shi (JP) --.

Signed and Sealed this

Fourth Day of January, 2005

JON W. DUDAS
*Director of the United States Patent and Trademark Office*